(12) United States Patent
Ridler

(10) Patent No.: US 9,420,775 B1
(45) Date of Patent: Aug. 23, 2016

(54) ICE FISHING REEL WITH INTERIOR LIGHTS

(71) Applicant: Roger Ridler, Olivia, MN (US)

(72) Inventor: Roger Ridler, Olivia, MN (US)

( * ) Notice: Subject to any disclaimer, the term of this patent is extended or adjusted under 35 U.S.C. 154(b) by 211 days.

(21) Appl. No.: 14/314,360

(22) Filed: Jun. 25, 2014

(51) Int. Cl.
- *A01K 89/00* (2006.01)
- *A01K 89/015* (2006.01)
- *A01K 97/12* (2006.01)
- *A01K 97/01* (2006.01)

(52) U.S. Cl.
CPC .............. *A01K 97/125* (2013.01); *A01K 97/01* (2013.01); *A01K 89/015* (2013.01); *A01K 89/0178* (2015.05)

(58) Field of Classification Search
CPC . A01K 97/01; A01K 97/125; A01K 89/0178; A01K 89/015
USPC ...................... 43/17; 242/305, 563
See application file for complete search history.

(56) References Cited

U.S. PATENT DOCUMENTS

| | | | |
|---|---|---|---|
| 2,457,075 A * | 12/1948 | Williams | A01K 87/007 43/17 |
| 3,275,260 A * | 9/1966 | Woollen | A01K 89/0102 43/17 |
| 5,040,323 A | 8/1991 | Hughes, Jr. | |
| 5,199,665 A * | 4/1993 | Tipton | A01K 97/125 242/238 |
| 5,570,532 A | 11/1996 | Shaffer et al. | |
| 5,996,268 A | 12/1999 | Buczkowski et al. | |
| 6,193,387 B1 * | 2/2001 | Schlichting | A01K 89/015 43/17.5 |
| 6,433,703 B1 * | 8/2002 | Tucker | A01K 89/0102 340/815.5 |
| 6,857,218 B1 | 2/2005 | Grahl et al. | |
| 7,008,086 B1 | 3/2006 | Kell | |
| 7,036,267 B2 | 5/2006 | Klein | |
| 7,188,793 B2 | 3/2007 | Ikuta et al. | |
| 7,225,102 B2 | 5/2007 | Stiner et al. | |
| 7,290,897 B2 | 11/2007 | Schmidt | |
| 7,343,708 B2 | 3/2008 | Pieczynski | |
| 7,357,343 B2 | 4/2008 | Hoag et al. | |
| 7,364,105 B1 * | 4/2008 | Yeh | A01K 89/01 242/223 |
| 7,395,628 B2 | 7/2008 | Rayfield | |
| 7,562,488 B1 | 7/2009 | Perkins et al. | |
| 7,624,531 B2 | 12/2009 | Kirby | |
| 7,883,043 B2 | 2/2011 | Wilson et al. | |
| 7,921,592 B2 | 4/2011 | Carelock | |
| 7,946,076 B2 | 5/2011 | Gascoigne | |
| 8,099,898 B2 | 1/2012 | Dungan | |
| 8,302,343 B2 | 11/2012 | Carignan et al. | |
| 9,179,659 B1 * | 11/2015 | Berthiaume | A01K 97/125 |
| 2006/0130387 A1 | 6/2006 | Shumansky | |
| 2006/0265931 A1 | 11/2006 | Mcfadden et al. | |
| 2007/0227057 A1 | 10/2007 | Holmberg | |
| 2007/0271835 A1 | 11/2007 | Wicinski | |
| 2009/0139130 A1 | 6/2009 | Nozzarella | |
| 2011/0277369 A1 | 11/2011 | Martinella et al. | |
| 2011/0278860 A1 | 11/2011 | Lupinacci | |
| 2012/0210626 A1 | 8/2012 | Manlick et al. | |
| 2012/0266516 A1 | 10/2012 | White | |
| 2012/0291332 A1 | 11/2012 | Nolf | |
| 2013/0227873 A1 | 9/2013 | Coulson | |
| 2014/0090287 A1 | 4/2014 | Olson et al. | |

FOREIGN PATENT DOCUMENTS

GB         2248161 A         4/1992

* cited by examiner

*Primary Examiner* — Marc Burgess
(74) *Attorney, Agent, or Firm* — Haugen Law Firm PLLP

(57) ABSTRACT

A fishing reel is described that may be used to alert a user of a fish strike. The device provides for both audible alerts and visual alerts, wherein the visual alerts are particularly well suited for alerting a user in a dark shelter or fish house.

19 Claims, 8 Drawing Sheets

ICE FISHING REEL WITH INTERIOR LIGHTS

CROSS-REFERENCE TO RELATED APPLICATIONS

Not Applicable

FEDERAL SPONSORSHIP

Not Applicable

JOINT RESEARCH AGREEMENT

Not Applicable

TECHNICAL FIELD

This invention pertains generally to fishing reels and, more particularly, the invention pertains to an ice fishing reel that provides audible and visual alerts to the user when the reel spool rotates.

BACKGROUND

Over the years various features of fishing reels have been devised specific to a particular type of fishing. For example, salt water, fresh water, pan fish, bait casting, spin casting, musky, and ice fishing reels all have features unique to the particular type of intended fishing. The extreme conditions that may be encountered when ice fishing demand a robust reel operable even when ice freezes on the line. Further, various techniques unique to ice fishing make it desirable to have an alert system incorporated into the reel. The alert system preferably has the capability to alert more than one sense of the user. For example, the user may fish for an extended period of time and may not have complete attention directed to the fishing reel at all times. Previously, spring loaded flags of various sorts have been devised to activate when the reel spool rotates. From time to time a user may prefer a visual and audible alert. Further, when fishing during darkness a flag alert may be difficult to apprehend.

SUMMARY

Embodiments according to aspects of the invention provide an ice fishing reel suitable for alerting a fisherman when a fish strikes. In accordance with aspects of the invention, an embodiment of the invention includes a spool adapted for receiving a fishing line, an axle about which the spool rotates, and an array of LED lights radially spaced on a substrate that is attached to the axle in a stationary orientation. The spool includes translucent sides or flanges that radiate light from the LED lights. The spool further includes a line receiving portion that may, for example without limitation, include a cylindrical hub or spaced apart dowels attached to the inner surface of the sides. The dowels or fishing line support members are oriented about the sides to form a line receiving cylinder portion with spaces in between the dowels. The cylinder portion formed by the hub or support members has a radius sufficient to contain the array of LED lights within a hollow portion defined by the hub or support members. A bell, die, marble, rattle, or other noise maker may also be contained within the hollow portion of the cylinder. When the spool is rotated or otherwise moved, the noise maker hits against the inside of the cylinder multiple times, emitting an audible noise or alarm. The spool may also include a spool crank attached to or coupled to the spool whereby the crank may be used by the user to rotate the spool.

The array of LED lights are radially spaced on a substrate and are electrically coupled together. A primary electrical lead interconnects all the LED lights together and is routed to a power supply. A hollow axle provides an electrical conduit for the primary electrical lead. As the spool rotates about the axle, the LED lights illuminate the translucent side flanges in a way that the entire side may appear to glow. In this manner, the spinning spool and LED lights provide a significant light source within a dark fish house. The LED lights may be selected to emit different wavelengths of light or a single wavelength as desired. For example, LEDs having blue, green and red wavelengths of color may be mixed together to form a white appearing light. Other known methods to produce white light from the LED array may be utilized, including, for example, the use of near-UV or a UV LED plus RGB phosphor (the UV LED excites the RGB phosphor which then emits white light). Additionally, the side flanges may be constructed from a UV reactive plastic to further enhance the lighting effect of the LED array.

The ice fishing reel according to an embodiment of the invention is coupled to a handle. An end of the axle is fixed to the handle in a way so that the handle, axle, and LED array remain stationary while the spool rotates about the axle. A rotation sensor and on/off switch may be incorporated into the electric circuit so that when the spool rotates the electric circuit is closed and the LED array is powered. Further, an additional on/off switch may be used to control the power to the LED array. The power supply may be coupled to the electric circuit and incorporated into the handle or, alternatively, the electric lead may include a plug of known suitable construction to allow a user to electrically connect the reel to an external power source.

In use, the user wraps a desired amount of fishing line around the spool cylinder and then rigs the line as desired. An extension from the handle allows the user to position and secure the reel over a hole in the ice while fishing. When a force is applied to the line (presumably from a fish bite), the line will unravel off the spool as the spool rotates about the reel axle. When the spool rotates a switch activates the LED array and both the noise maker and lights alert the user of reel action. The light from the LED illuminates the fish hole and a dark fish house or other shelter.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

Figure 1:
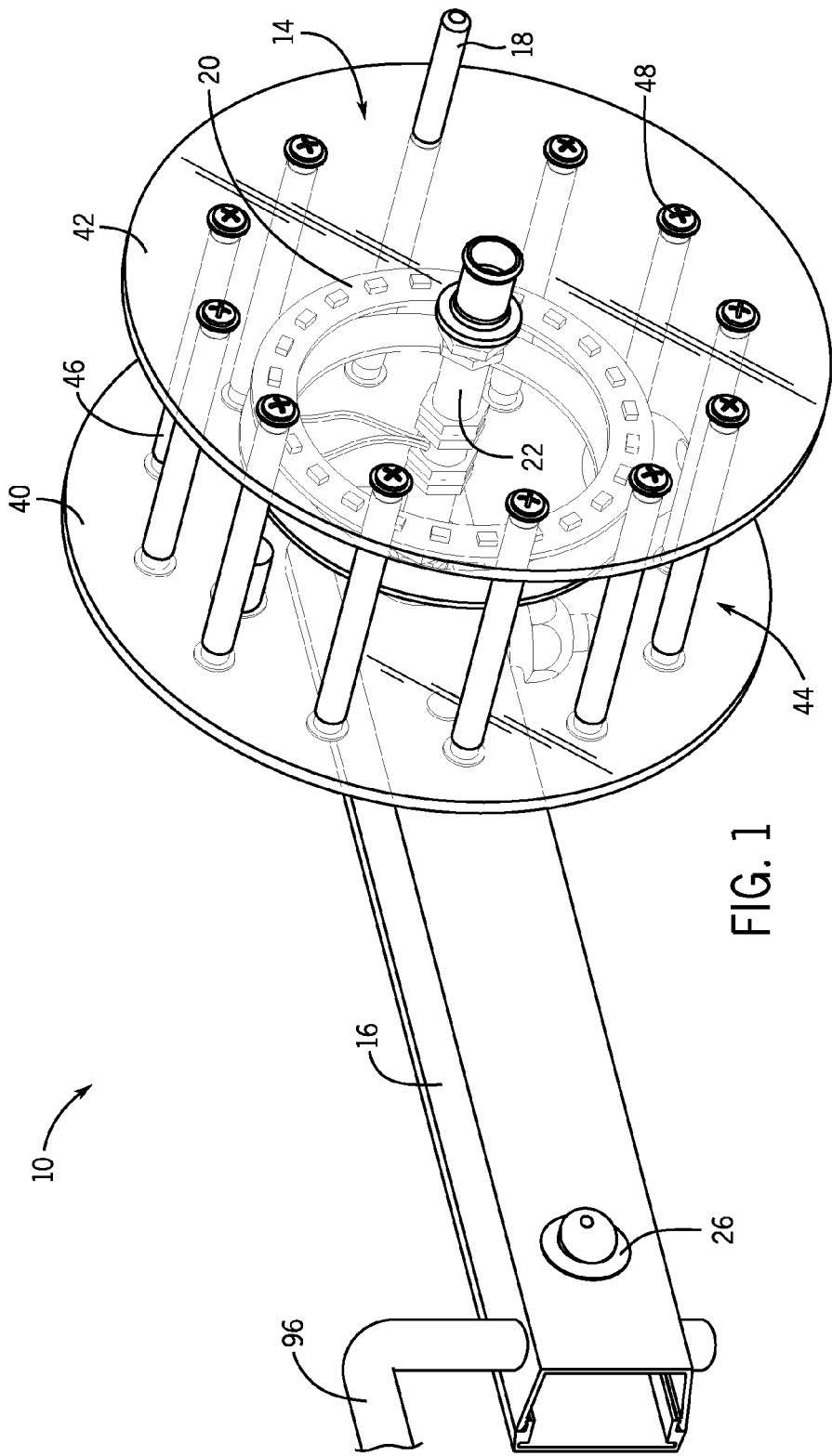
FIG. 1 is a perspective view of an ice fishing reel and handle in accordance with an embodiment of the invention.

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

A fishing reel 10 particularly well suited for ice fishing generally includes a spool 14, axle 22, and LED arrays 20. In an embodiment of the invention the spool 14 rotates about axle 22 while the LED arrays 20 remain stationary. As the spool rotates about the axle, the LED lights illuminate translucent sides of the spool in a way that the entire sides may appear to glow. In this manner, the spinning spool 14 and LED array 20 provides a significant light source for the user. In addition, the reel may include a noise making member 24 that rattles around inside the spool 14 and makes noise when the spool 14 rotates.

With reference to the Figures, the ice fishing reel 10 will be described in detail. FIG. 1 illustrates the reel 10 including spool 14, axle 22, and LED arrays 20. The axle 22 attached to handle 16 and a portion of a handle mount or extension 96 is illustrated. Spool 14 includes a crank or handle 18, first side or flange 40, second side or flange 42, and line receiving cylinder 44. The line receiving cylinder portion 44, in the embodiment illustrated, includes line support members 46 sandwiched between the two sides 40 and 42 of the spool 14 and fastened with fasteners 48 to the interior surface of each side. The plurality of line support members are preferably concentric and radially spaced apart to form a hub or cylinder portion 44 about which a fishing line may be wrapped.

The support members 46 may be constructed from wood, plastic or other material to form dowels that are not adversely affected by freezing water. Further, the spaced apart dowels allow water to more freely drip off the spool 14 rather than trapping the water between an enclosed hub and the fishing line. Those skilled in the art will appreciate that the spool may be constructed in other manners and materials to provide a unitary or multiple piece spool having with sides and a hollow central hub. The side flanges 40 and 42 may be constructed from a UV reactive plastic to further enhance the lighting effect of the LED array 20. Further, the translucent plastic may be a fluorescent acrylic chosen from a multitude of colors, including without limitation, green, orange, blue, yellow or red.

Figure 2:
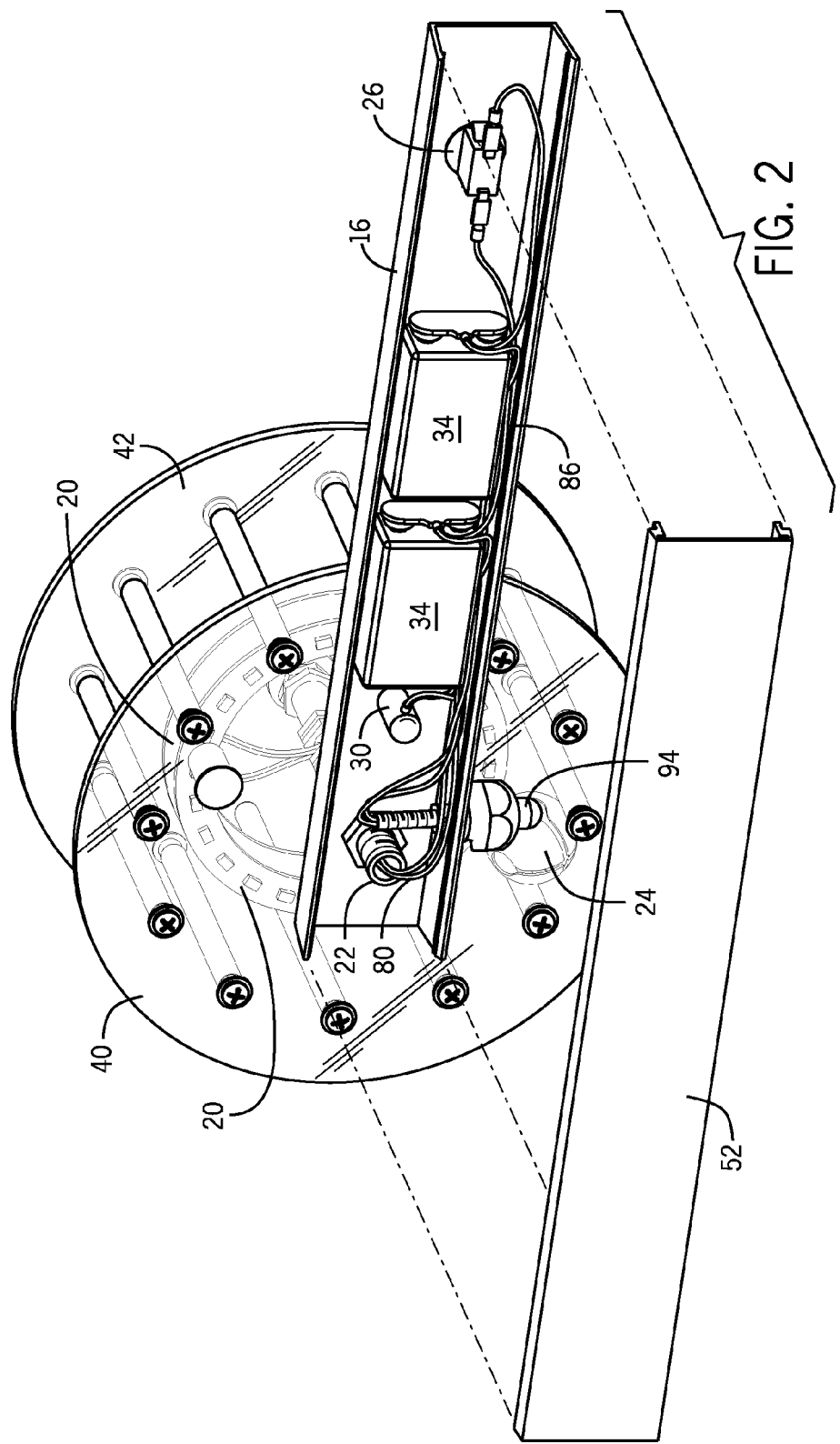
FIG. 2 is a partial exploded perspective view of a fishing reel and handle in accordance with an embodiment of the invention.

Referring now to FIG. 2, handle cover 52 is shown removed from the handle 16. The handle 16 may include a cavity to house a power supply 34, a portion of on/off switch 26, rotation switch 30, and electrical leads 80, 82, 84, and 86. An end of axle 22 is threaded 60 and secured to the handle with threaded nuts 76 turned onto the axle 22. Of course, the axle may be constructed and attached to the handle, with other suitable known attachments. Also attached to the handle is auxiliary light 94 which the user may use to, for example, light a fishing hole or provide light to the fishing line when attaching a rig to the line.

Figure 3:
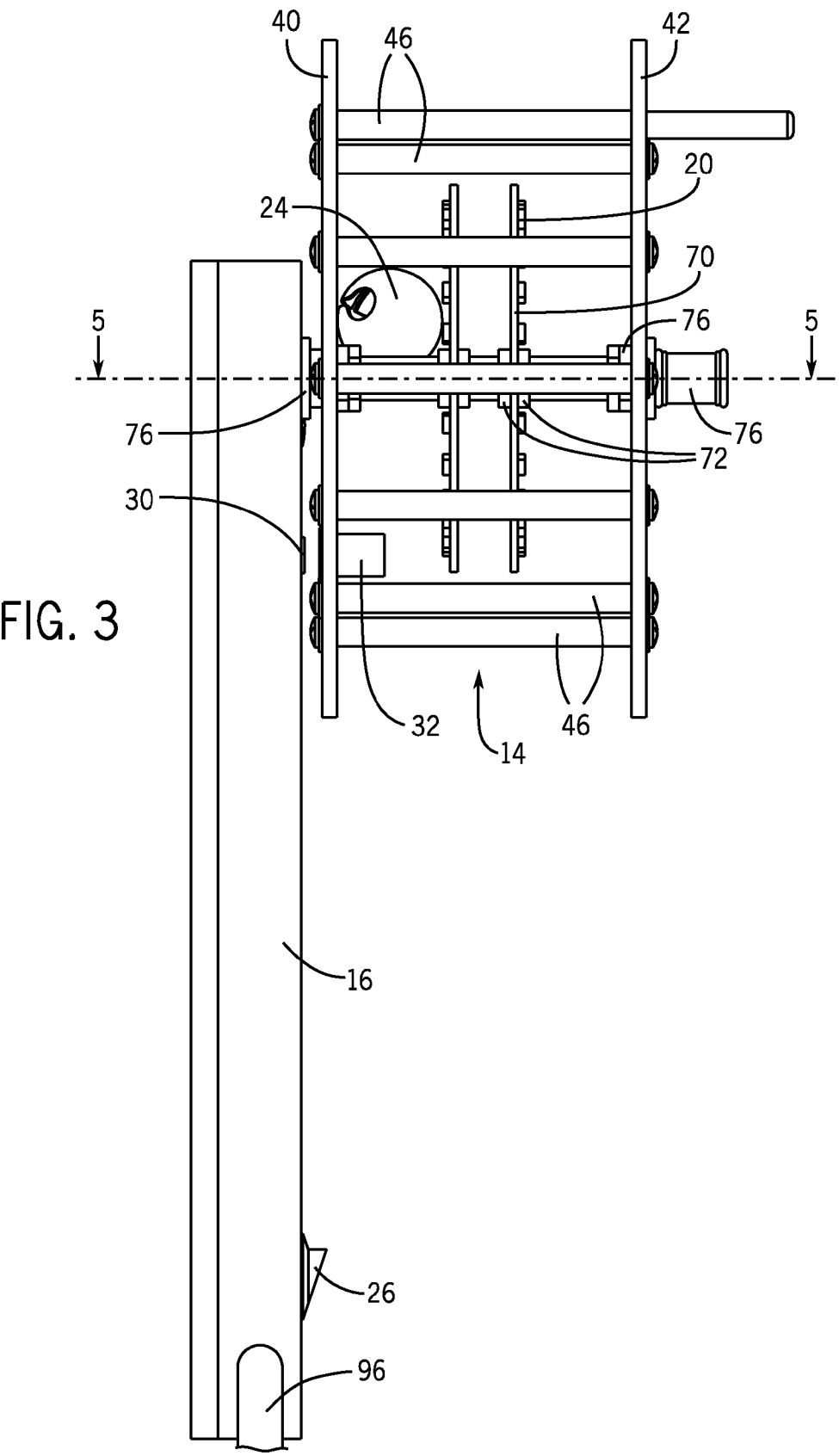
FIG. 3 is a top plan view of the fishing reel and handle of the type shown in FIG. 1.
Figure 4:
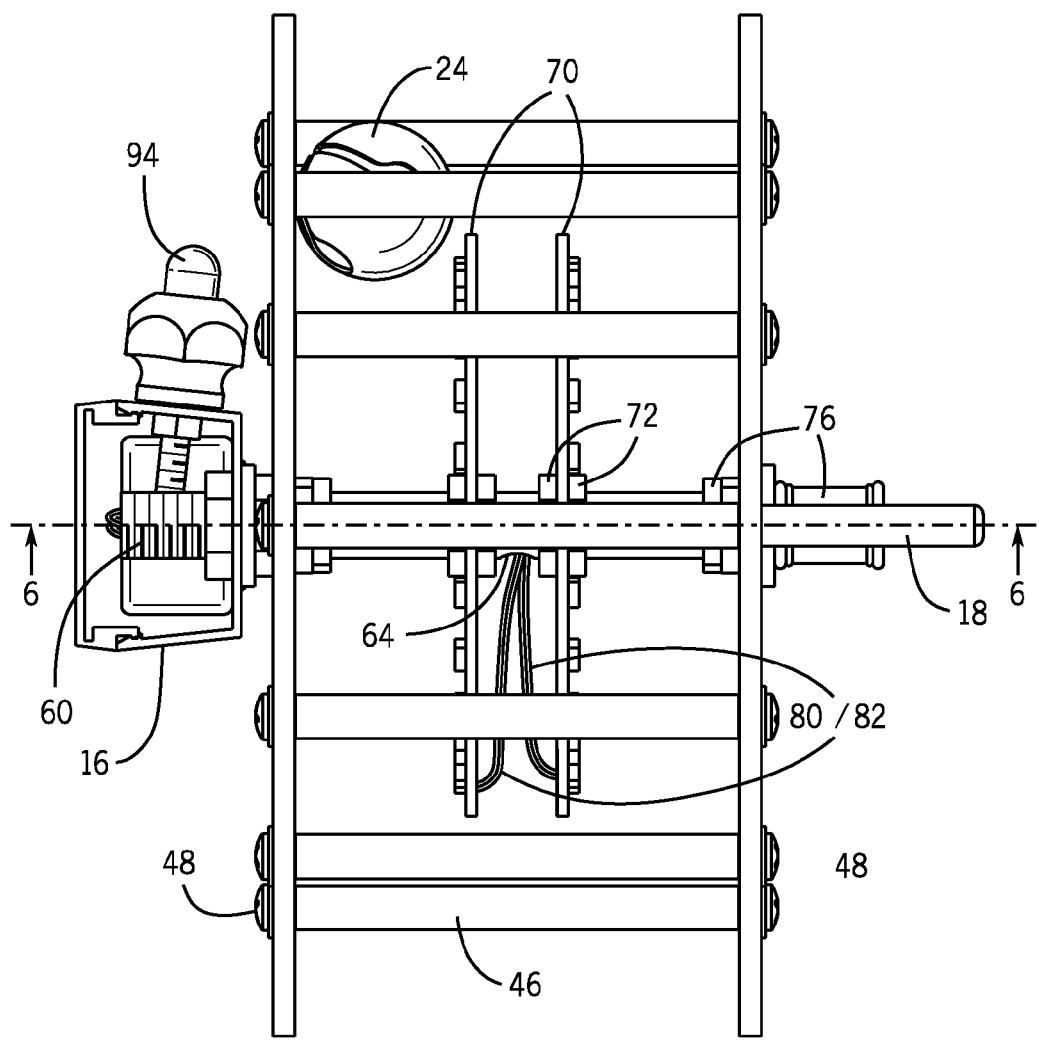
FIG. 4 is an end view of the fishing reel and handle of the type shown in FIG. 1.
Figure 5:
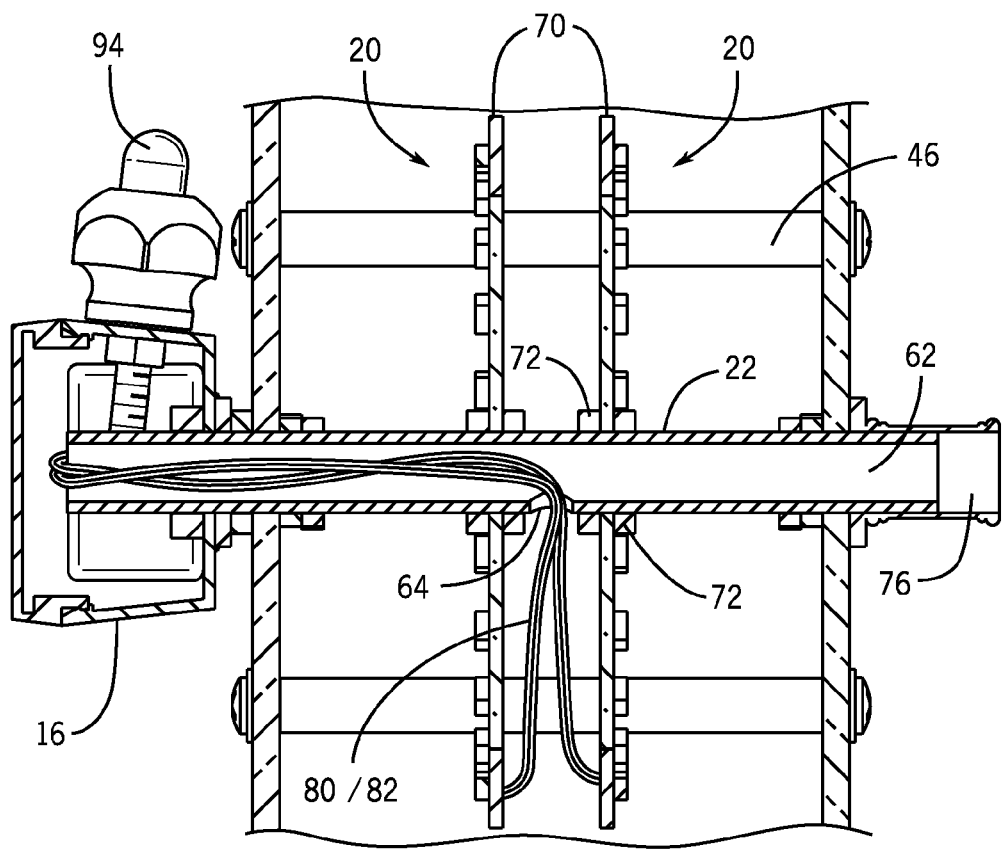
FIG. 5 is a partial sectional view taken along line 5-5 shown in FIG. 3.
Figure 6:
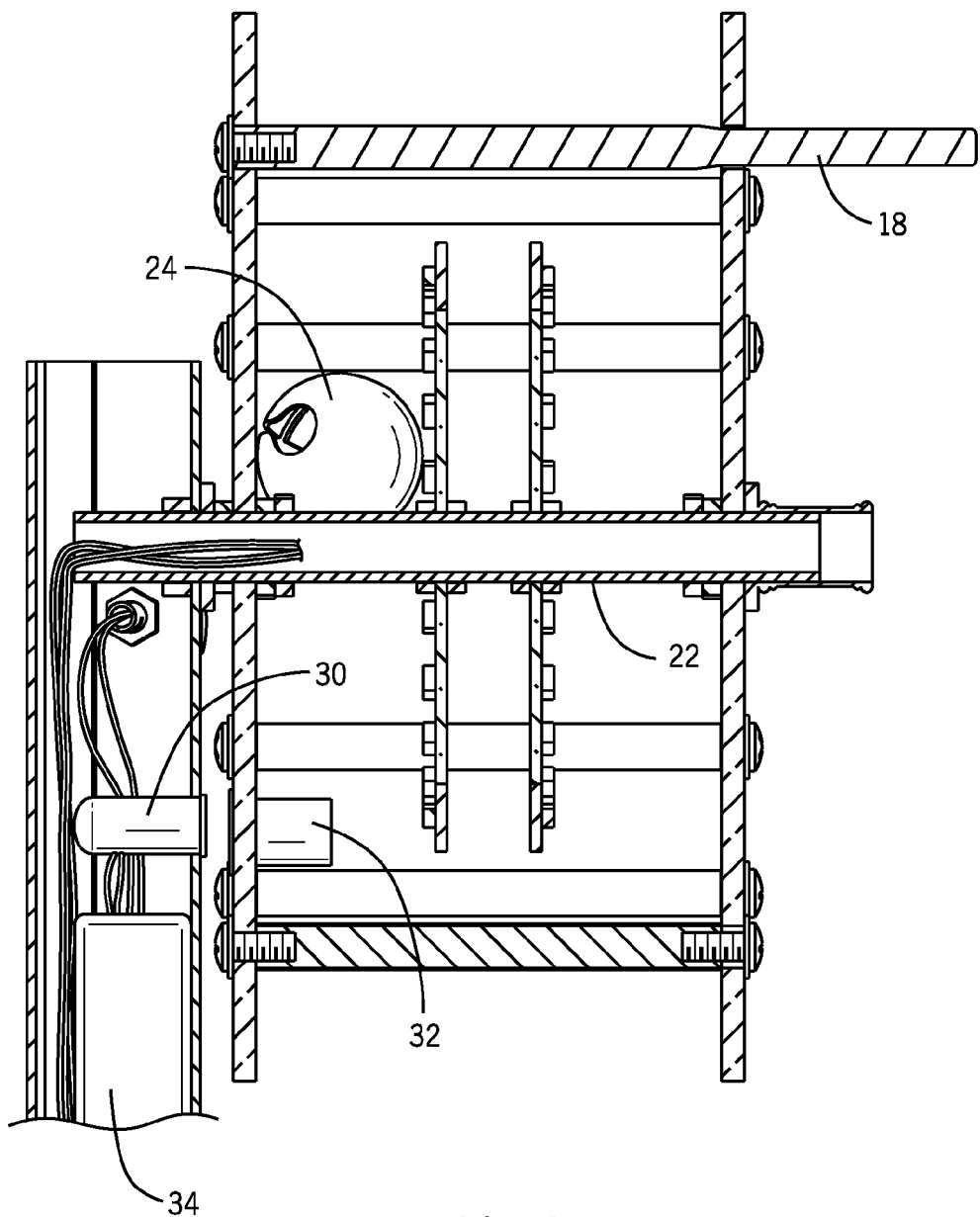
FIG. 6 is a partial sectional view taken along line 6-6 shown in FIG. 4.
Figure 7:
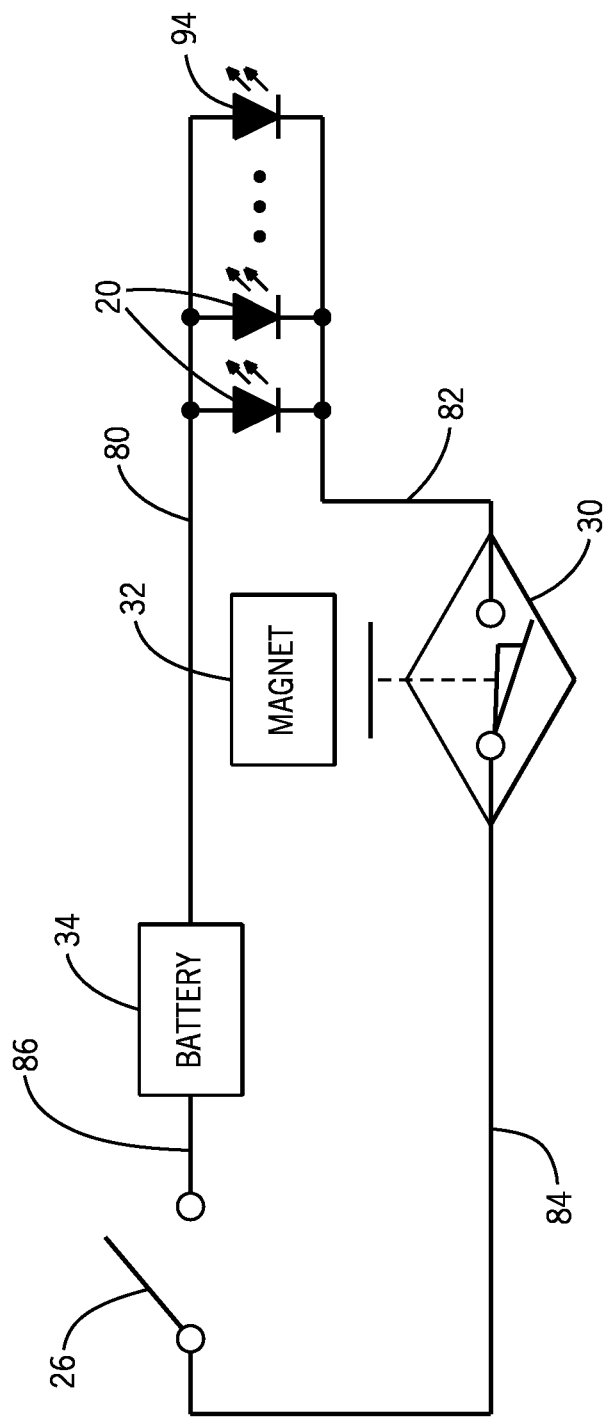
FIG. 7 is an electrical schematic of the ice fishing reel in accordance with an embodiment of the invention.

FIG. 3 further illustrates the alignment of the various components of the reel 10. Spool 14 includes sides 40, 42 and line receiving cylinder 44 (comprised of line support members 46) that enclose or encase LED arrays 20 and noise maker 24. The axle 22 is securely attached to the handle with nuts 76. Additional nuts 76 are coupled to the axle 76 and confine the sides 40, 42 along the axle while allowing the spool sides to spin freely about the axle 22. In contrast, nuts 72 are threaded on axle 22 on either side of substrate 70 to secure the LED array 20 in a fixed relation about axle 22. Those skilled in the art will appreciate that the substrate 70 of the array 20 may be secured to the axle by other known components without departing from the scope of the invention. Permanent magnet 32 is affixed to spool side 40 and acts upon magnetic responsive switch or rotation sensor 30 to close switch 30 when the spool 14 rotates.

The LED array 20 includes a plurality of radially spaced low voltage LED lights that may be selected to emit different wavelengths of light or a single wavelength of light as desired. The LEDs are electrically coupled together from a single primary electrical lead 80 and may emit common wavelengths of light or multiple selected wavelengths of light. For example, LEDs having blue, green and red wavelengths of color may be aligned radially around the substrate 70 to form an array of white appearing light. Other known methods to produce white light from the LED array may be utilized, including, for example, the use of near-UV or a UV LED plus RGB phosphor (the UV LED excites the RGB phosphor which then emits white light).

Referring next to FIGS. 4-7 the electrical circuit will be further described. Primary electrical lead 80 electrically interconnects LED arrays 20 and auxiliary LED 94 to power supply 34. Lead 82 connects the arrays 20 and LED 94 to magnetic operable switch 30. Switch 30 and on/off switch 26 are connected via lead 84 and on/off switch 26 is connected to power supply 34 via lead 86. Leads 80 and 82 route into axle bore 64 and through a hollow center 62 of the axle 22. The leads 80, 82 exit the hollow interior of axle 22 into the cavity of the handle 16.

Figure 8:
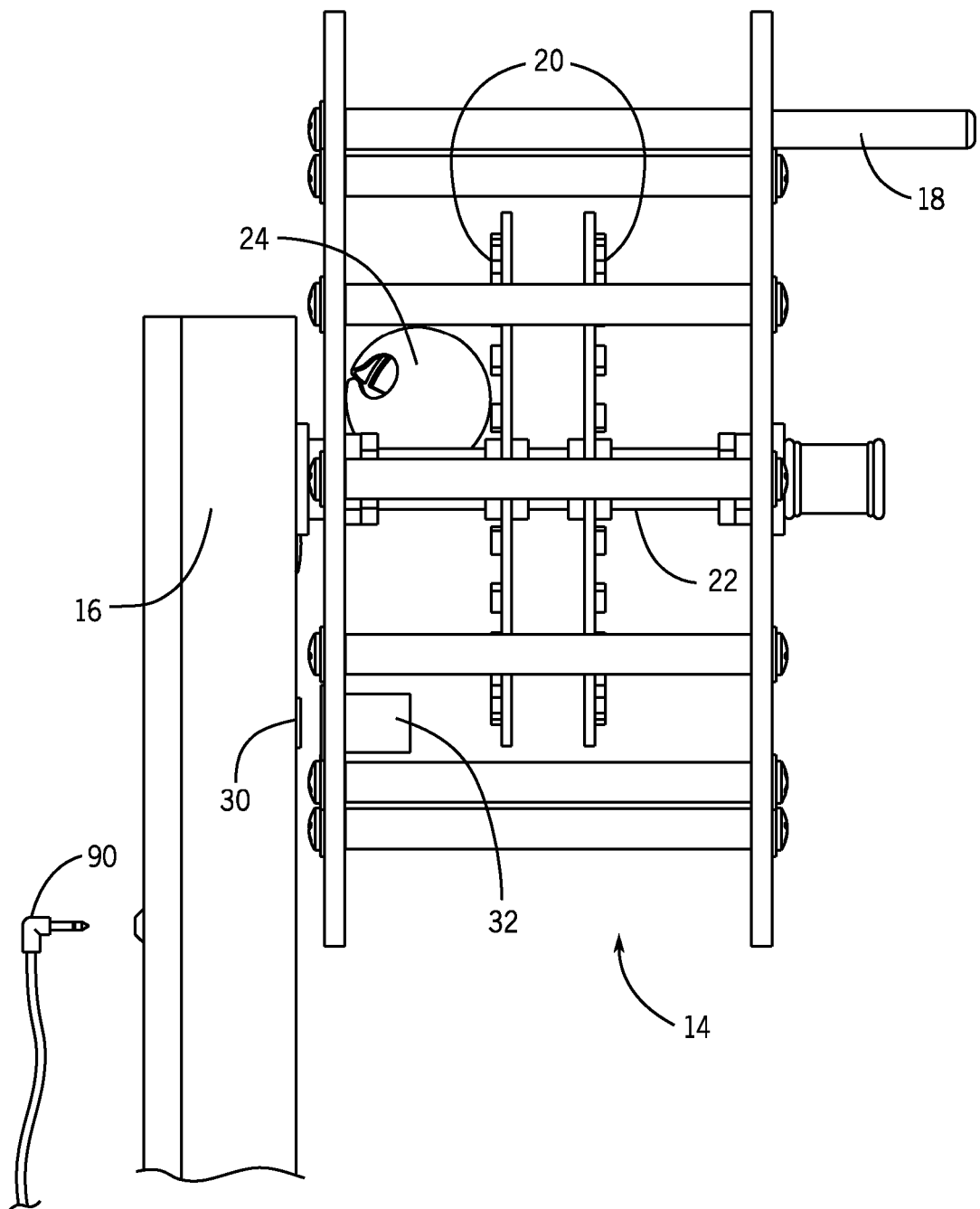
FIG. 8 is a top plan view of an ice fishing reel and handle in accordance with an embodiment of the invention.

Inside the handle, the power supply 34 is electrically coupled to the on/off switch 26, rotation switch 30, and auxiliary light 94. Alternatively, the power supply may be provided from an external source electrically connected to the electric circuit via a plug 90 of known suitable construction (see FIG. 8). Without limitation, the power source may come from a remote battery, auxiliary power of a flasher sonar system, or an ac/dc converter.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

What is claimed is:

1. An ice fishing reel comprising:
a spool adapted for receiving a fishing line;
an axle about which the spool rotates;
said spool having line support members oriented about said axle to form a line receiving cylinder; and
an array of LED lights radially spaced on a substrate and fixed in a stationary orientation to said axle, wherein said array of LED lights is contained within said line receiving cylinder and said array of LED lights includes electrical leads routed through a hollow portion of said axle.

2. The ice fishing reel as recited in claim 1, wherein said spool includes first and second spaced apart flanges and said line support members engaged between said first and second flanges.

3. The ice fishing reel as recited in claim 2, further including a handle coupled to the axle and a noise maker contained within said line receiving cylinder.

4. The ice fishing reel as recited in claim 1, further including a rotation sensor.

5. The ice fishing reel as recited in claim 1, further including a spool crank coupled to said spool.

6. The ice fishing reel as recited in claim 1, further including an electric hookup electrically connected to the electrical leads to facilitate connection with an external power supply.

7. The ice fishing reel as recited in claim 1, wherein said array of LED lights emit light having visible and ultraviolet wavelengths.

8. The ice fishing reel as recited in claim 2, wherein said side flanges are comprised of a translucent UV reactive plastic.

9. An ice fishing reel comprising:
an axle,
a spool engaged to said axle and having a central portion that is rotatable about said axle, said spool further having a line receiving portion and translucent side flanges;
an array of radially spaced LEDs fixed to a substrate and arranged between the translucent side members of said spool, wherein said substrate is fixed to said axle; and
electrical leads connected to said array of LEDs for electrically interconnecting said LEDs to a power supply, said electrical leads routed through a hollow portion of said axle.

10. The ice fishing reel as recited in claim 9, wherein said array of LEDs is further arranged within a space defined by said line receiving portion.

11. The ice fishing reel as recited in claim 10, further including a noise maker contained within the space defined by said cylindrical forming line receiving portion.

12. The ice fishing reel as recited in claim 9, further including a rotation sensor.

13. The ice fishing reel as recited in claim 9, further including a spool crank coupled to said spool.

14. The ice fishing reel as recited in claim 9, further including a hookup electrically connected to the electrical leads to facilitate connection with an external power supply.

15. The ice fishing reel as recited in claim 9, wherein said array of LEDs emits light having visible and ultraviolet wavelengths.

16. The ice fishing reel as recited in claim 9, wherein said translucent side flanges are comprised of a UV reactive plastic.

17. The ice fishing reel as recited in claim 9, further including a handle, wherein said axle is attached to said handle and retained stationary relative to said handle.

18. An ice fishing reel comprising:
an axle,
a spool engaged to said axle and having a central portion that is rotatable about said axle, said spool further having a cylindrical forming line receiving portion and translucent UV reactive side flanges;
a rotation sensor to sense rotation of said spool;
an array of radially spaced LED lights fixed to a substrate and arranged between the translucent side members of said spool, wherein said substrate is fixed to said axle and arranged within the cylindrical forming line receiving portion; and
electrical leads connected to said array of LED lights for electrically interconnecting said LED lights to a power supply, said electrical leads routed through a hollow portion of said axle.

19. The ice fishing reel as recited in claim 18, further including a hookup electrically connected to the electrical leads to facilitate connection with an external power supply.

* * * * *